United States Patent [19]
Nakanishi et al.

[11] 3,938,077
[45] Feb. 10, 1976

[54] ALARM DEVICE FOR CONTINUALLY INDICATING THE STATE OF AIR PRESSURE IN A PLURALITY OF TIRES

[75] Inventors: Kenzo Nakanishi; Yasuaki Hanasaka, both of Kyoto, Japan

[73] Assignee: Bridgestone Tire Company, Ltd., Tokyo, Japan

[22] Filed: Nov. 25, 1974

[21] Appl. No.: 527,010

[30] Foreign Application Priority Data
Nov. 28, 1973 Japan............................. 48-136400

[52] U.S. Cl. ................. 340/58; 340/224; 325/117; 200/61.25
[51] Int. Cl.² ...................................... B60C 23/02
[58] Field of Search ......... 340/58, 224; 325/15, 111, 325/117; 220/61.22, 61.25

[56] References Cited
UNITED STATES PATENTS
3,806,869  4/1974  Davis, Jr. ............................. 340/58

*Primary Examiner*—Alvin H. Waring
*Attorney, Agent, or Firm*—Sughrue, Rothwell, Mion, Zinn & Macpeak

[57] ABSTRACT

An alarm device for informing reduction of pneumatic pressure of tires comprises a group of oscillators each consisting of an oscillator circuit, an electric power supply source thereof, a switch for closing an electric power supply circuit when the internal pressure of the tire is lowered to less than a prescribed value and radiation antenna, a group of receiver tuning circuits having a receiver antenna, a sweep generator, a comparison circuit for generating the gate control signal, a gate circuit for sequentially gating the output of a ratio detection circuit, pulse noise elimination circuits consisting of monostable circuits and smoothing filters, comparators for comparing the smoothed DC signal with reference signals which discriminate the operation of an oscillator, and alarm devices for generating alarm information.

17 Claims, 9 Drawing Figures

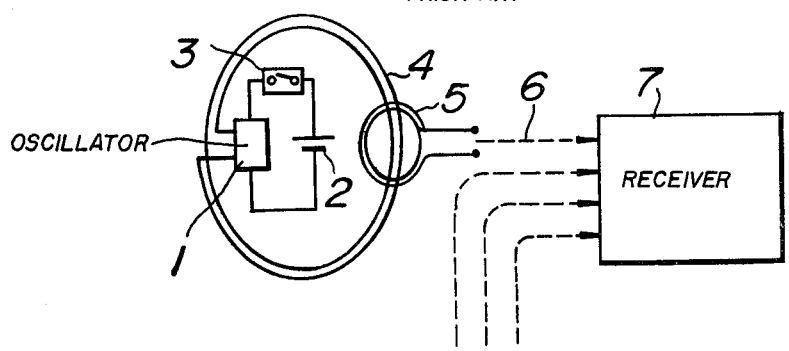
FIG_1
PRIOR ART
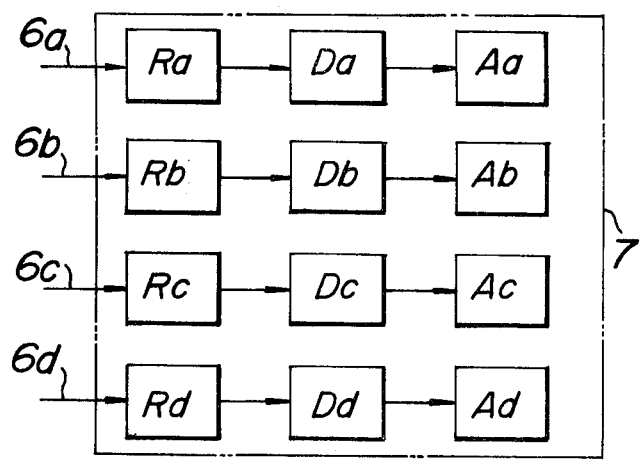
FIG_2
PRIOR ART

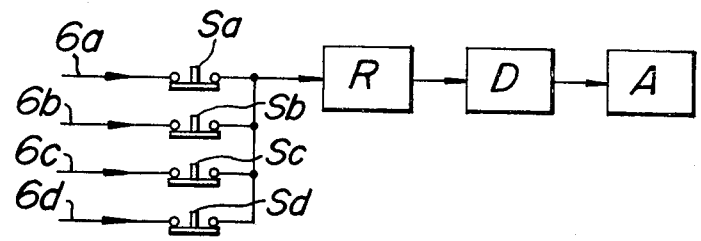
FIG_3
PRIOR ART
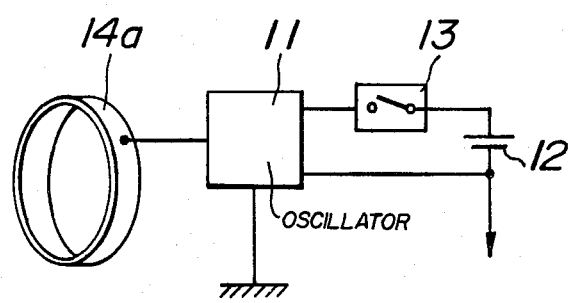
FIG_4

FIG_5
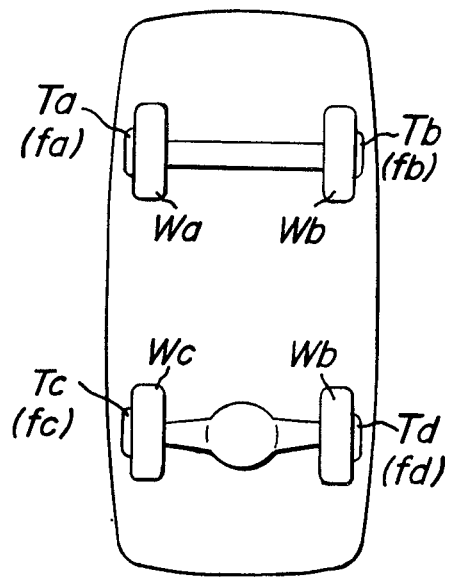
FIG_8
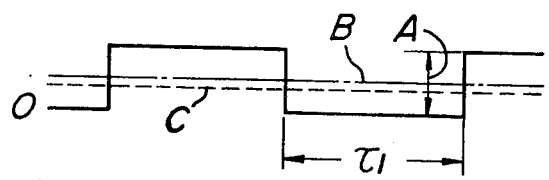

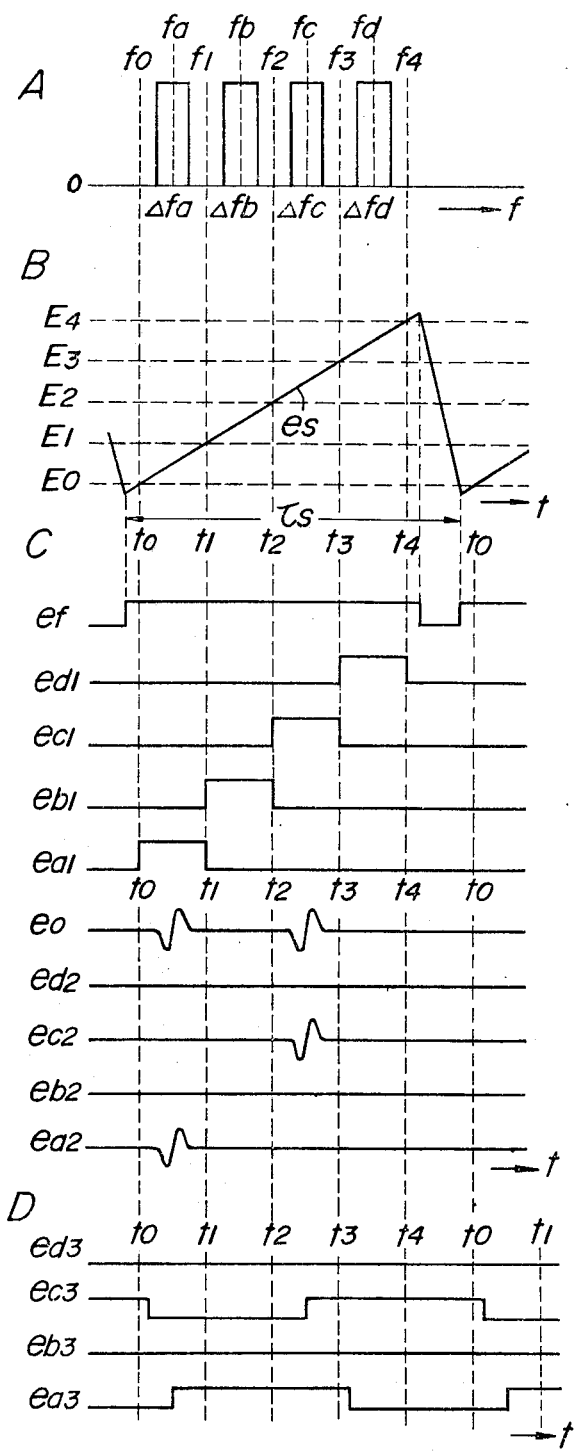

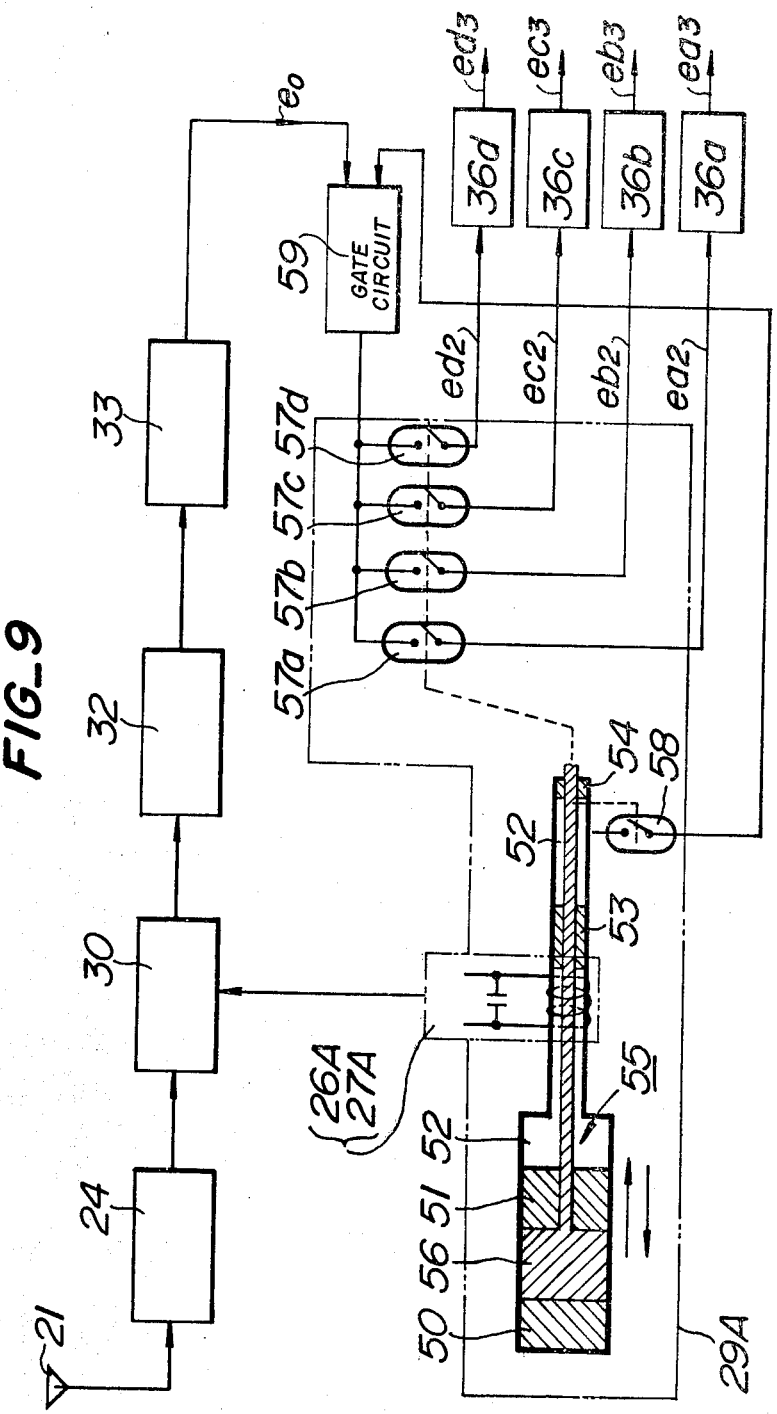

ALARM DEVICE FOR CONTINUALLY INDICATING THE STATE OF AIR PRESSURE IN A PLURALITY OF TIRES

BACKGROUND OF THE INVENTION

1. Field of the Invention

The present invention relates to an alarm device for informing reduction of pneumatic pressure of tires in which when pneumatic pressure of tires of a vehicle is reduced by some reason while running or stopping of the vehicle this reduction is automatically sensed and the sensed signals are informed to drivers as an alarm information, particularly, a transmitter and receiver device for use in such an alarm device.

2. Description of the Invention

While running, particularly, high speed running of the vehicle, the reduction to less than the prescribed value of the pneumatic pressure of the tires makes the driver very dangerous so that the driver must know this reduction by some means. For this purpose various means relating to such device have been proposed. However, such device in the prior art has some defects and then the elimination of these defects is desired. Some of these defects pointed out in the prior arts are explained herinafter. FIG. 1 shows one embodiment of the relative relation between an oscillator of the prior device and a sensing coil for the reception of the incoming signals. The device comprises one set of a mechanism consisting of an oscillator 1, a power supply source 2, a sensing switch 3 which closes its contacts in case of lowering internal pressure of the tire to less than the prescribed value, and an electromagnetic radiation coil 4 for transmitting the output of the oscillator, and said mechanism is attached to the rotating wheel having tire. A sensing coil 5 is attached to the portion of a car body at the position nearly opposite to the coil 4. The output terminals 6 of the coil 5 are connected to a receiver 7 provided to the car body, respectively.

In this device when the internal pressure of any one of the tires is reduced to less than the prescribed value the sensing switch 3 is closed and thus a circuit including the power supply source 2 is closed so that the supply voltage is applied to the oscillator 1 and an alternating current thus generated flows through the coil 4. A part of an alternating magnetic field generated by the current through the coil 4 is passed through the coil 5 so that a voltage is induced in the coil 5 and thus an AC voltage is supplied to the receiver 7 from the output terminal 6 of the coil 5 resulting in the transmission and reception of the desired alarm information. The receiver 7 comprises, as shown in FIG. 2, receiver circuits R$a$, R$b$, R$c$, and R$d$, detection circuits D$a$, D$b$, D$c$, and D$d$ and alarm circuits A$a$, A$b$, A$c$, and A$d$ in channels 6$a$, 6$b$, 6$c$, and 6$d$ of sensing coils. Alternatively, as shown in FIG. 3, normally closed switches S$a$, S$b$, S$c$, and S$d$ are provided in the input channels of the system, respectively, and the outputs of these switches are OR-functionally connected to the receiver consisting of only one system of a receiver circuit R, a detection circuit D and an alarm circuit A. In the receiver constructed as shown in FIG. 2, when any one of the oscillators is operated the each corresponding alarm device of the system is operated so that this oscillator is separately identified. Moreover, in this receiver, the provision of many systems each consisting of a receiver, detector and alarm device becomes expensive.

In another known alarm device constructed as shown in FIG. 3 when either one of the oscillators is operated the receiver is operated through each switch formed by normally closed contacts. The identification of the oscillator related to the operation of the receiver is performed by sequentially making each switch OFF state. Then, the oscillator corresponding to the switch which stops the alarm at the OFF state may be identified. The defect of this device is that both the radiation coil 4 of the oscillator and the sensing coil 5 must be provided at the rear side of the wheel. In this case it is not preferable to provide the coil 4 near to the metal portion of the wheel because of large induction loss. On the contrary when the coil 4 is provided far from the metal portion of the wheel the attachment of the coil 4 is difficult because of no space between the wheel and the suspension portion of the axle. Therefore, the coil 4 is after all provided to the side wall of the tire at the rear side of the wheel. However, such provision makes the detachment of the tire from the wheel rim difficult when the punctured tire is changed. While the sensing coil 5 must be attached to the portion that relative distance between the sensing coil 5 and the radiation coil 4 is unchanged, i.e., to the axle housing forming a part of the suspension device of the vehicle. In addition, in order to lead the conductor wires to the receiver provided in the operator cabin the special machining to the completed car must be performed, and these elements must be attached every wheel. Moreover, in the receiver shown in FIG. 3 it is difficult to identify simultaneously operating oscillators.

The prior device above described utilizes an induction field in the propagation theory of electromagnetic wave in order to transmit the signals to the receiver from the oscillator and the radiator and the senser must be electromagnetically coupled or electrostatically coupled, i.e., nearly placed with each other so that the above described defects cannot be avoided.

On the contrary, when the radiation of the oscillator or the radiation field, i.e., the electromagnetic wave is utilized the relative distance between the radiator and the receiving antenna is large so that the intensity of the electromagnetic field at the receiving points falls off at the inverse square of its distance as compared with previous embodiment. While the SN ratio of desired signals and noises generated at the ignition system of the engine becomes worse so that the radiation power of the oscillator must be increased in order to improve this SN ratio but the capacity and the mass of the electric power supply source provided to the wheel are limited considering dynamic balancing and available space. While a mechanism of a slip ring and a brush or the like is required in order to supply the power from the car body rather than the wheel so that the attachment of this mechanism becomes very difficult and thus the increasing of the radiation power for improving the NS ratio cannot be easily realized in practice.

SUMMARY OF THE INVENTION

An object of the present invention is to eliminate the above described defects of the prior device.

Another object of the present invention is to provide an alarm device for informing reduction of pneumatic pressure of tires in which noise interference generated when radiation electromagnetic wave is utilized may be eliminated.

Further object of the present invention is to provide an alarm device for informing reduction of pneumatic pressure of tires including at least one receiver antenna and only one system of receiver mechanism to identify operating or non-operating condition of oscillator provided to each wheel irrespective of single or simultaneous operation of the oscillators.

The alarm device according to the present invention comprises a group of oscillators each consisting of an oscillator circuit, an electric power supply source thereof, a switch for closing an electric power supply circuit when the internal pressure of the tire is lowered to less than a prescribed value and radiation antenna, a group of receiver tuning circuits having a receiver antenna, a sweep generator, a comparison circuit for generating the gate control signal, gate circuit for sequentially gating the output of a ratio detection circuit, pulse noise elimination circuits consisting of monostable circuits and smoothing filters, comparators for comparing the smoothed DC signal with reference signals to discriminate the operation of an oscillator, and alarm devices for generating alarm information.

BRIEF DESCRIPTION OF THE DRAWING

FIG. 1 is a principle diagram showing one embodiment of a relative relation of the oscillator and the receiver sensing coil of a conventional device;

FIGS. 2 and 3 are block diagrams showing the construction of the receiver according to the conventional method;

FIG. 4 is an oscillator circuit showing one embodiment of a receiver device used in an alarm device for informing reduction of pneumatic pressure of tires according to the present invention;

FIG. 5 shows a bottom view of a vehicle in which oscillators are provided at the wheels, respectively;

FIG. 7 is a graph showing the output waveform appeared at the various points of the circuit shown in FIG. 6;

FIG. 8 is a graph showing the relation between a smoothed output (level B) and a reference voltage Er (level C) in the output waveform of a monostable circuit used in the circuit shown in FIG. 6; and FIG. 9 is a circuit diagram showing another embodiment of the sweep generator used in the circuit shown in FIG. 6.

DESCRIPTION OF THE PREFERRED EMBODIMENT

Figure 6:
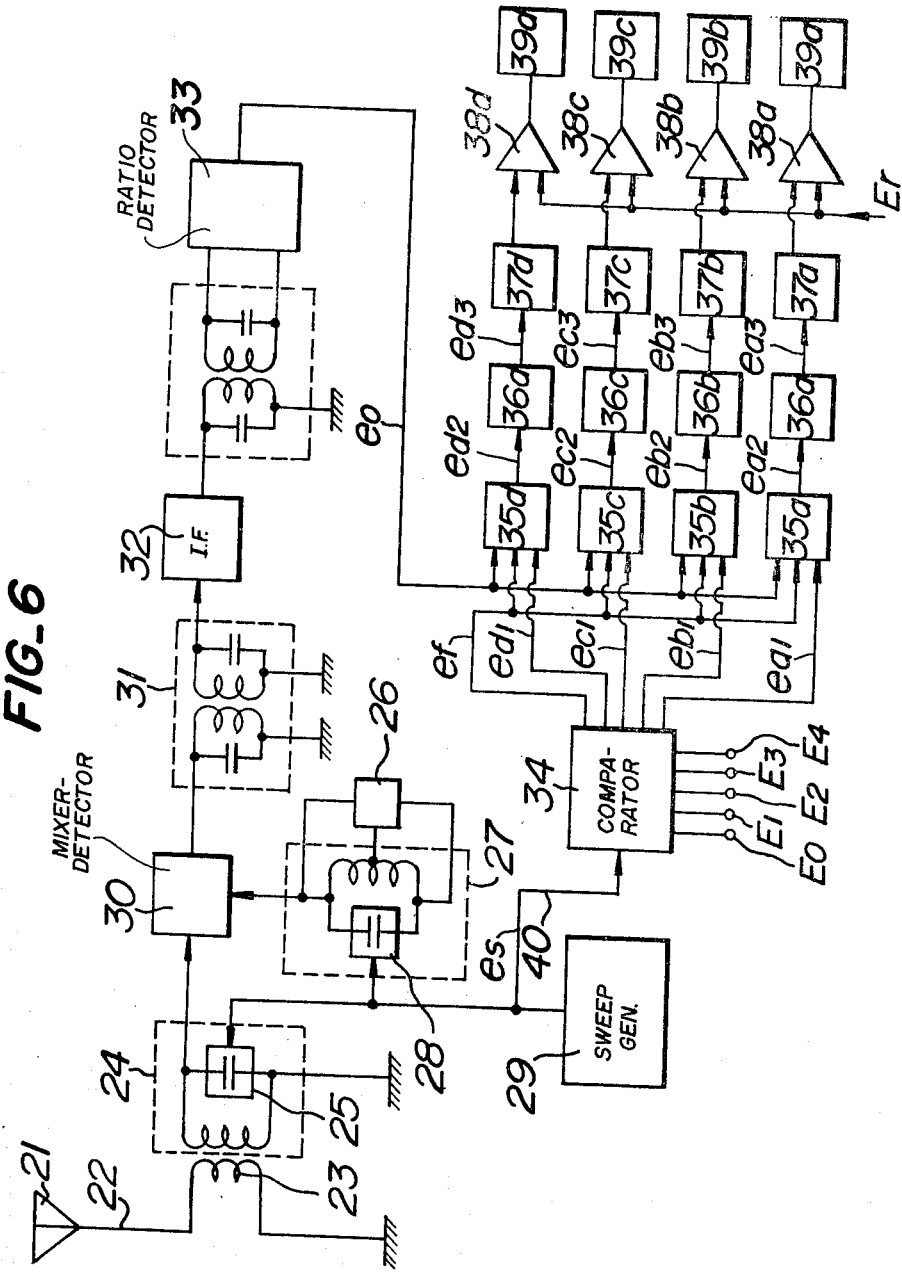
FIG. 6 is a circuit diagram showing a receiver according to the present invention.

Referring to FIG. 4, one embodiment of an oscillator section for use in the device according to the present invention is shown. The oscillator section comprises an oscillator circuit 11, an electric power supply source 12 of the oscillator, a switch 13 for closing its contacts when the internal pressure of the tire is lowered to less than a prescribed value, and an antenna 14a for radiating electromagnetic wave and these elements are attached to the center portion of the outer side of the wheel as an oscillator. That is, these oscillators T$a$, T$b$, T$c$, and T$d$ are attached to wheels having tires W$a$, W$b$, W$c$, W$d$, respectively, as shown in FIG. 5. The embodiment of the present invention is explained with respect to the four-wheel vehicle, but the present invention is not limited thereto and may also be applied to the other vehicle having a plurality of wheels.

The frequencies of electromagnetic wave generated by the oscillators T$a$-T$d$ are properly set such that as shown in FIG. 7 adjacent frequencies are of $f_a \pm \Delta f_a/2$, $f_b \pm \Delta f_b/2$, $f_c \pm \Delta f_c/2$, and $f_d \pm \Delta f_d/2$, respectively, and thus allowable frequency bands are respectively set as $\Delta f_a$, $\Delta f_b$, $\Delta f_c$, and $\Delta f_d$.

FIG. 6 is a circuit showing one embodiment of a receiver according to the invention. In this circuit a receiver antenna 21 attached to the outer side of a car body is connected to an input coil 23 of the receiver provided in the operator cabin through a line 22. A capacitor 25 of an input tuning circuit 24 and a capacitor 28 of a resonance circuit 27 have capacitances controlled by an output signal $e_s$ of a sweep generator 29 so that frequency bands $f_0$-$f_4$ shown in FIG. 7A are repeatedly swept as receiving ranges of the input frequencies by constantly holding resonance frequencies of an IF tuning circuit 31 for the output of a mixing and detecting circuit 30 a value $f_i$ by means of the difference between the resonance frequencies of the tuning circuit 24 and the resonance circuit 27. The tuning circuit 31 is of an IF transformer of a superheterodyne system and and IG signal is applied to a ratio detector circuit 33 through an IF amplifying circuit 32. The amplifying circuit 32 is constructed in a manner that it has an amplitude control circuit by which an IF signal more than a constant level is suppressed so as to keep the amplitude of the signal constant. The ratio detector circuit 33 is of conventional one and the detected output $e_o$ is continuously varied from negative to positive when the frequency of incoming signal is deviated in the band of the intermediate frequency from the smller band to the larger band than the intermediate frequency band with respect to the central value $f_{io}$ of said band while the detected output is zero when the frequency of the signal is coincided with the value $f_{io}$.

The output waveform of the sweep generator 29 is a repeated saw-tooth waveform as shown in FIG. 7B and the range of the frequency of the received signal by the frequency sweeping is set $f_0$ for the voltage $E_0$ of the line 40, $f_1$ for $E_1, \ldots$, and $\Delta f_a < f_1-f_0$, $\Delta f_b < f_2-f_1, \ldots$, for the allowable width $\Delta f_a$, $\Delta f_b, \ldots$, of the frequency of the generator 29 as shown in FIG. 7A. The voltages having same value with the voltage $E_0, E_1, \ldots$, are applied to a voltage comparator circuit 34 as a comparison and reference voltage. Therefore, the logic circuit is constructed in a manner that the logic output "1" is generated by sequentially comparing the swept voltage $e_s$ of the line 40 with the reference voltage whenever the voltage $e_s$ is coincided with the reference voltage and the logic output "0" is generated when the voltage $e_s$ is coincided with the next higher reference voltage. As shown in FIG. 7C the logic outputs of multi-systems $e_{a1}, e_{b1}, \ldots$ of the comparator circuit 34 become the logic output "1" for $E_0 < e_s \leq E_1$, $E_1 < e_s \leq E_2, \ldots$ with respect to the swept voltage $e_s$ and become the logic output "0" for the time interval other than the above defined time interval. As has clear from the relation between these logic outputs and the time instant, at the time instant such as the time instant $t_0$ for the point of sweep frequency $f_0$, $t_1$ for $f_1$, $t_2$ for $f_2 \ldots$ the logic outputs of the multi-system delayed by one section such as time interval $t_0 < t \leq t_1$ in the output line $e_{a1}$, $t_1 < t \leq t_2$ in $e_{b1} \ldots$ are obtained and these outputs are supplied to the gate circuits 35$a$-35$d$ as a control signal. On the other hand, the output $e_o$ of the ratio detector circuit 33 is supplied to the gate circuits 35$a$-35$d$ as a common input. If this voltage $e_o$ operate the oscillators T$a$ and T$c$ and thus electromagnetic waves having frequencies $f_a$ and $f_c$ are transmitted the detected signal for the oscillator T$a$ is obtained as a voltage $e_o$ shown in FIG. 7C in the time interval $t_0 < t \leq t_1$ and the detected signal as a voltage $e_o$ for the oscillator T$c$ is obtained in the time interval $t_2 < t \leq t_3$ while the signal for the oscillator T$a$ is obtained in the output voltage $e_{a1}$ of the gate circuit and the signal for the oscillator T$c$ is obtained in the output voltage $e_{c2}$. Then, the output $e_{a2}-e_{d2}$ of the gate circuits appear as an output signal in response to the oscillators T$a$–T$d$ only when the corresponding oscillator is operated. Circuits 36$a$–36$d$ are of monostable circuit and operated by the outputs $e_{a2}-e_{d2}$ of the gate circuits. In this case as shown in FIG. 8 the inversed duration $\tau_1$ of the monostable circuits is a half of the recurrency period T$s$ of the sweep. Circuits 37$a$–37$d$ are of smoothing circuit by which the square wave, i.e., the output of the monostable circuit is smoothed and thus the voltage of level B shown in FIG. 8 is obtained. Circuits 38$a$–38$d$ are of voltage comparator to which common reference voltage E$r$ is applied. The value of this voltage E$r$ is set to a value slightly less than the average level B as shown by level C of FIG. 8. When the monostable circuit of each system does not operate the output of the circuit 37 becomes lower value than the level C and the logic output "0" appears at the output of the voltage comparator 38 of each system, but when any one of the monostable circuits is operated the output of the circuit 37 in the corresponding system becomes higher level than the level C and the logic output of the voltage comparator 38 becomes "1". Circuits 39$a$–39$d$ are of alarm device such as buzzer or lamp by which an alarm is informed to the driver only when the output of the circuit 38 is "1" in response to the oscillators T$a$–T$d$.

The circuit shown in FIG. 6 shows an embodiment of the receiver in which a variable electrostatic capacitance element operated by voltage control is used to sweep signals having the resonance frequencies of the input tuning circuit 24 and the local resonance circuit 27 and the control signal is of voltage. It will be obvious that the present invention is not limited to the embodiments described above, but many variations are possible to those skilled in the art without departing from the scope of the invention. For instance, there is used a variable electrostatic capacitance element or a variable inductance element actuated by a mechanical displacement. For example, as the capacitance elements, mention may be made of a means for rotating a rotor of a variable capacitor by a motor or a solenoid, or a means for shifting a cylinder capacitor to the axial direction and utilizing the capacitance change thereof, etc. Further, as the inductance elements, mention may be made of a means for shifting an oxide core of an inductor to the axial direction and utilizing a change of the inductance thereof.

Moreover, the comparison circuit 34 can be constructed in such a manner that gate control signals of the output system corresponding to a plurality of sweeping levels as described above against the input due to the mechanical displacement are obtained. As an embodiment, as shown in FIG. 9, there is a mechanical viscous sweeper 29A in which in the inside of a plunger 55 consisting of a fixed iron core 50, a supporting element 51, a plunger element 52, an oxide core 53 and a permanent magnet 54 is filled oil 56 having proper viscosity, the plunger 55 is reciprocated in the directions of arrows, and the oxide core 53 is shifted within the coil of the local oscillation circuits 26A and 27A, thereby varying the inductance of the coil and mechanically sweeping the oscillatory frequency. Further there are provided reed relays 57$a$, 57$b$, 57$c$ and 57$d$ and 58 cooperating with the plunger 55 and there is also provided a gate circuit 59 between these relays and the ratio detection circuit 33 of the receiver. Therefore, according to the mechanical viscous sweeper 29A, the voltage comparison circuit 34 and the gate circuit 35 shown in FIG. 6 can be omitted.

Further, the capacitor and inductor of the input tuning circuit and the local oscillation circuit can be interlocked.

In the circuit construction shown in FIG. 6, each circuit from the antenna 21 to the detection circuit 33 is based on the superheterodyne system, but instead of this system, there can be used the so-called beat system, i.e., the frequency range of the frequency $f_{osc}$ of the output signal of the local oscillation circuit is almost matched with the frequency range of the frequency $f_i$ of the input signal so as to make $f_1 < f_i < f_2$ and $f_1 < f_{osc} < f_2$, and in case of receiving the input signal $f_i$, the beat signal is generated at the output side of the low frequency selective amplifier near the frequency of $|f_i - f_{osc}| = f_A$, and this beat signal is used as an alarm. In addition, the AFC type superheterodyne system can be used. In addition, the input tuning circuit in the circuit construction of FIG. 6 is of an amplifier having band pass characteristics from $f_0$ to $f_4$ instead of variable tuning by the sweep and the intermediate frequency for the input signals within this frequency range may be obtained by a local oscillator same as that of FIG. 6.

Further, there is provided an additional resistance in the input tuning circuit, so that tuning reception of a broad band can be carried out. In addition, the provision of a double tuning circuit and the shift of its tuning frequency make the tuning reception of the broad band possible.

As described in the foregoing, when the frequency bands of the radiation electromagnetic wave from a plurality of oscillators caused by the reduction of pneumatic pressure of tires are preferably set and one system of a receiver antenna and its receiver is provided, if any one of a plurality of the oscillators of wheels having tires radiates the electromagnetic wave, a current having an oscillation frequency of the corresponding oscillator simultaneously flows through the receiver antenna 21, its line 22 and the input coil 23 of the receiver. The tuning circuit 24, according to the aforementioned sweep principle, is sequentially tuned with the lapse of a sweeping time at the position of sweep frequency of the frequency band $f_x \pm \Delta f_x/2$ ($x$: the number of the oscillators to be operated) against the corresponding oscillator within the band up to the tuning frequency $f_0-f_n$, while the tuning circuit 27 of the local oscillator circuit 26, according to the similar sweep principle, has frequencies different by $f_i$ to $f_x$, and thus sequentially generates signals of intermediate frequencies to a plurality of input frequencies $f_x$ as sweeping in the output tuning circuit 31 of a mixing and detecting circuit 30. The IF amplifying circuit 32 uses $f_{io}$ as a central frequency and has the band of $\pm \Delta f_{iw}/2$ and the detection characteristic of the ratio detector circuit 33 obtains the detected output consisting of $-a$ in $f_{io}-\Delta f_{iw}/2$, 0 in $f_i = f_{io}$, and $+a$ in $f_{io}+\Delta f_{iw}/2$, when the frequency $f_{a1}$ of one oscillator is existent during the sweeping, the detected output can be obtained only in the sweeping time interval of $f_e$ consisting of $f_{io}-\Delta f_{iw}/2 < f_a$, $-f_e < f_{io}+\Delta f_{iw}/2$ for frequency $f_e$ of the local oscillator. For example, when the oscillators T$a$ and T$c$ shown in FIG. 5 are operated, the detected outputs thereof are generated in the time intervals of $t_0-t_1$ and $t_2-t_3$ within one sweeping period such as the output $e_o$ shown in FIG. 7C.

The detected output $e_o$, as mentioned before, is separated into the outputs $e_{a2}$, $e_{b2}$, $e_{c2}$ ... by each time interval $t_0-t_1$, $t_1-t_2$, $t_2-t_3$ ... during the sweeping period by means of a plurality of gate circuits, and in the aforementioned example, $e_o$ is separated and distributed as $e_{a2}$, $e_{c2}$ shown in FIG. 7C. These signals in each system drive the monostable circuit 36 at each generating point thereof so that the output square waves of the circuit 36 are supplied to the smoothing circuit 37, respectively, and the d.c. output components of the circuit 37 are obtained as a level B shown in FIG. 8. These d.c. components are compared with reference voltages Er common to each system, i.e., the level C shown in FIG. 8 in the comparator 38 and then the logic output for the alarm circuit 39 is obtained. When this output is "1", the alarm device is actuated, and as a result, an alarm is obtained by corresponding to one or a plurality of operated oscillators, so that which tire of the wheel is reduced can be identified.

The characteristic of the device according to the invention in the above operations lies in to provide a receiver device which can positively receive faint electromagnetic waves from each oscillator by only one receiver antenna. Commonly, the electromagnetic waves of noise emitted from the engine system of the vehicle are very large and these noise currents flow through the input coil of the receiver. In order to remove such noises, the following methods are employed. That is, these noises generally cause at the time of intermittent action of the mechanical contact of a large current circuit and they are a radiation electromagnetic wave caused by a large current transionally flowed through the line, so that for a very short time interval from the beginning of contacting contacts or the like to the completion thereof, or from the contacted state to the completion of cutting, frequency distribution of the noises becomes a slight electromagnetic wave having the frequency component of continuous time change, but frequency distribution of the radiation electromagnetic wave caused by a transitional phenomanon on the circuit immediately after completion of the action of the contacts becomes almost stable in a very short time interval, and thereafter immediately becomes attenuated and disappeared. Further, frequency distribution of these noises has a different pattern each time noises are generated. On the other hand, in the receiver device, the frequency for permitting reception of the signals, as described in the foregoing, is in the form of slit of the IF band width $\Delta f_{iw}$ the sweep and the reception of a signal having the sweep speed $S=(f_4-f_0)/\tau_s$ are performed, so that for the signals from each oscillator, regardless of the non-modulation (CW) of the signal, the signal is transmitted as a frequency modulated component in the intermediate frequency. As a result, the IF amplifying circuit and the ratio detector circuit having amplitude limitation can be employed. Then, amplitude variation of the noise can completely be removed. Further, when the slits are responded to the frequency distribution band for the frequency variation or non-variation component at a slight time interval contained in said noise, this is restrained by utilizing the time responsive delay characteristic of the detector circuit.

The oscillator is to operate by closing the power supply circuit by the closure of the switch shown in FIG. 4 at the time of reducing pneumatic pressure of the tire, but even if this switch is closed under the reduced condition of the internal pressure as an average value, every time when the internal pressure of the tires is varied while running a bad road and the internal pressure is raised, the switch is opened and an intermittent phenomenon appears. As a result, there is caused a case that the signal input of the receiver becomes intermittent. Then, the circuit 37 is to smooth the output sqaure wave of the monostable circuit 38 and to prevent said signal intermittent phenomenon. Further, this device can modify the construction of the oscillator to the simplest non-modulation system. In addition, since reception of the signal is formed into a sweeping system, each oscillator can cheaply be manufactured with remarkable effect without using any highly stable and highly expensive elements such as a crystal oscillator for stabilizing frequencies.

The construction explained in the foregoing aims at to automatically discriminate and alarm which tire is reduced among a plurality of wheels with tires. FIGS. 5 and 6 show one embodiment for discriminating reduction of pneumatic pressure of four wheels with tires, and for the purpose of alarming without discriminating for more than one wheel with tire, the construction shown in FIG. 6 can be applied. One of such examples is performed by setting the frequencies of the oscillator all the same frequency band in the constructions case the sweep frequency band of the receiver is made smaller enough to include this band and the comparator circuit and the gate circuit are not required. Further, the monostable circuit, the smoothing circuit, the comparator and the alarm circuit can easily be constructed by unifying into one system.

In this construction, when one oscillator is operated, the monostable circuits are driven by one detected signal per a sweeping period, and a plurality of oscillators are operated at the same time, the monostable circuits are driven by the same number of detected signals per the sweeping period. In either case, an inversion duration of the monostable circuit is made about ½ of the sweeping period, so that the mean value of the square wave is equal to or more than the level B shown in FIG. 8, so that it is compared with the level C by the comparator circuit and a logic signal "1" is generated and supplied to the alarm circuit. That is, when one or a plurality of oscillators is operated, regardless of the number of the position of the operated oscillator, an alarm can be generated, without spoiling the essential effects of the present invention, such as an effect of removing noises, frequency stability of oscillators, etc.

What is claimed is:

1. An alarm device for informing reduction of pneumatic pressure of tires comprising a transmitter means including a group of transmitters provided at wheels having tires and each consisting of an oscillator circuit, an electric power supply source for said oscillator, a switch for closing an electric power supply circuit to supply the voltage to the oscillator when the internal pressure of the tire is lowered to less than a prescribed value and a radiation antenna for electromagnetic waves; a receiver means including at least one receiver antenna for reception of electromagnetic waves from the transmitters, and a receiver turning circuit capable of continuously tuning over a range of a predetermined tuning frequency covering a plurality of frequency sections; a sweep generator for sweeping said tuning circuit; a signal processing means including a comparison circuit for comparing the sweeping output of the sweep generator with reference voltages to generate gate control outputs of the multiple channels corresponding to the number of the sweep frequency sections, gate circuits for sequentially gating the output of the receiver means by said gate control signals, monostable circuits operated by the outputs of the gate circuits, pulse noise elimination circuits consisting of smoothing filters and for smoothing the outputs of the monostable circuits and comparators for comparing the smoothed DC outputs of the pulse noise elimination circuits with reference signals for discrimination of the operated transmitter; and alarm display means operated by the outputs of the signal processing means for generating and displaying alarm information.

2. An alarm device as claimed in claim 1, wherein the frequency of each oscillator of the transmitters is non-modulated and allowable frequency band is set to $f_{ao}-\Delta f_a/2 < f_a \Delta f_{ao} + \Delta f_a/2 < f_{bo} - \Delta f_b/2 < f_b < f_{bo} + \Delta f_b/2 \ldots$ 3. An alarm device as claimed in claim 1, wherein the tuning frequency band of the receiver tuning circuit is set to a range between $f_1(<f_{ao}-\Delta f_a/2)$ and $f_2(>f_{no}+\Delta f_n/2)$.

4. An alarm device as claimed in claim 1, further comprising a ratio detector circuit coupled between the output of the receiver tuning circuit and the inputs of the gate circuits in the signal processing means, and wherein the frequency of the oscillators is set within the allowable range of $f_o-\Delta f_o/2 < f < f_o+\Delta f_o/2$ and the range of the sweeping and tuning frequency of the receiver is determined by the receiver circuit set to include the above allowable frequency range and the sweeping circuit whereby the alarm is generated by processing the output of the ratio detector circuit by one channel of the monostable circuit, the smoothing filter circuit and the comparator circuit for comparing the output of the smoothing filter circuit with the reference signal.

5. An alarm device as claimed in claim 1, wherein the receiver tuning circuit is consisted of an input tuning circuit inductively coupled to an input coil connected to the receiver antenna and formed by a parallel combination of an inductor and a capacitor, and a resonance circuit formed by a parallel combination of an inductor and a capacitor which are connected to a local oscillator circuit in parallel.

6. An alarm device as claimed in claim 5, wherein the capacitor of the input tuning circuit and the capacitor of the resonance circuit are an electronically variable capacitance element.

7. An alarm device as claimed in claim 5, wherein the capacitor of the input tuning circuit and the capacitor of the resonance circuit are a mechanically variable capacitance element.

8. An alarm device as claimed in claim 5, wherein the inductor of the input tuning circuit and the inductor of the resonance circuit are a mechanically variable inductance element.

9. An alarm device as claimed in claim 3, wherein the receiver tuning circuit is made of a band pass filter having a double-tuned circuit.

10. An alarm device as claimed in claim 4, wherein the receiver tuning circuit is made of a band pass filter having a double-tuned circuit.

11. An alarm device as claimed in claim 3, wherein an additional Q-damping resistor is connected to the receiver tuning circuit in parallel to make broad-band receiver tuning possible.

12. An alarm device as claimed in claim 4, wherein an additional Q-damping resistor is connected to the receiver tuning circuit in parallel to make broad-band receiver tuning possible.

13. An alarm device as claimed in claim 9, wherein the variable frequency element of the local oscillator circuit is a variable inductance element.

14. An alarm device as claimed in claim 11, wherein the variable frequency element of the local oscillator circuit is a variable inductance element.

15. An alarm device as claimed in claim 9, wherein the capacitance of the resonance circuit is a variable capacitance element.

16. An alarm device as claimed in claim 11, wherein the capacitance of the resonance circuit is a variable capacitance element.

17. An alarm device as claimed in claim 1, wherein the sweep generator comprises a mechanical viscous sweeper having a plunger reciprocable in viscous liquid to produce quick forward motion and slow backward motion, a core mounted on the plunger, and a coil of a local oscillation circuit cooperating with the core to produce sweep signals.

* * * * *